US011134073B2

(12) United States Patent
Mathew et al.

(10) Patent No.: US 11,134,073 B2
(45) Date of Patent: Sep. 28, 2021

(54) DETECTION OF BOTNET HOSTS USING GLOBAL ENCRYPTION DATA

(71) Applicant: Cisco Technology, inc., San Jose, CA (US)

(72) Inventors: Thomas Manianghat Mathew, Sunnyvale, CA (US); Dhia Mahjoub, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 434 days.

(21) Appl. No.: 16/251,220

(22) Filed: Jan. 18, 2019

(65) Prior Publication Data

US 2020/0036701 A1 Jan. 30, 2020

Related U.S. Application Data

(60) Provisional application No. 62/711,125, filed on Jul. 27, 2018.

(51) Int. Cl.
*H04L 29/06* (2006.01)
*H04L 29/12* (2006.01)
(Continued)

(52) U.S. Cl.
CPC .......... *H04L 63/0823* (2013.01); *G06F 17/16* (2013.01); *H04L 41/16* (2013.01);
(Continued)

(58) Field of Classification Search
CPC . H04L 63/0823; H04L 61/1511; H04L 43/04; H04L 41/16; H04L 63/1408; H04L 2463/144; H04L 63/166; G06F 17/16
(Continued)

(56) References Cited

U.S. PATENT DOCUMENTS 8,260,914 B1 9/2012 Ranjan
8,762,298 B1 6/2014 Ranjan et al.
(Continued)

FOREIGN PATENT DOCUMENTS

KR 1182793 B1 9/2012

OTHER PUBLICATIONS

Mahjoub, et al., "Catching malware en masse: DNS and IP style", https://www.blackhat.com/docs/us-14/materials/us-14-Mahjoub-Catching-Malware-En-Masse-DNS-And-IP-Style-WP.pdf, 33 pages, Aug. 16, 2014, blackhat.com.
(Continued)

*Primary Examiner* — Mohammad W Reza
(74) *Attorney, Agent, or Firm* — Behmke Innovation Group LLC; Kenneth J. Heywood; Jonathon P. Western

(57) ABSTRACT

In one embodiment, a device obtains certificate information for a plurality of network addresses. The device constructs, based on the certificate information, a bipartite graph that maps nodes representing common names from the certificate information to nodes representing autonomous systems. The device determines edge counts from the bipartite graph for the nodes representing the autonomous systems. The device identifies, based on the edge counts, a particular one of the common names as botnet-related by comparing edge counts for the autonomous systems associated with that particular common name to edge counts for the autonomous systems associated with one or more of the other common names.

20 Claims, 12 Drawing Sheets

(51) Int. Cl.
  *H04L 12/26* (2006.01)
  *G06F 17/16* (2006.01)
  *H04L 12/24* (2006.01)

(52) U.S. Cl.
  CPC .......... *H04L 43/04* (2013.01); *H04L 61/1511* (2013.01); *H04L 63/1408* (2013.01); *H04L 2463/144* (2013.01)

(58) Field of Classification Search
  USPC .......................................................... 726/23
  See application file for complete search history.

(56) References Cited

U.S. PATENT DOCUMENTS

| | | |
|---|---|---|
| 9,635,049 B1 | 4/2017 | Oprea et al. |
| 2012/0216157 A1* | 8/2012 | Luo ...................... G06F 30/394 716/55 |
| 2017/0041332 A1 | 2/2017 | Mahjoub et al. |
| 2017/0147706 A1* | 5/2017 | Roth .................... G06F 16/9024 |
| 2019/0325076 A1* | 10/2019 | Haglin ................. G06K 9/6892 |

OTHER PUBLICATIONS

Mahjoub, et al., "Identification of malicious SSL networks by subgraph anomaly detection", https://flocon2018.sched.com/event/C8Q4/identification-of-malicious-ssl-networks-by-subgraph-anomaly-detection, 4 pages, Jan. 8-11, 2018, FloCon 2018.

\* cited by examiner

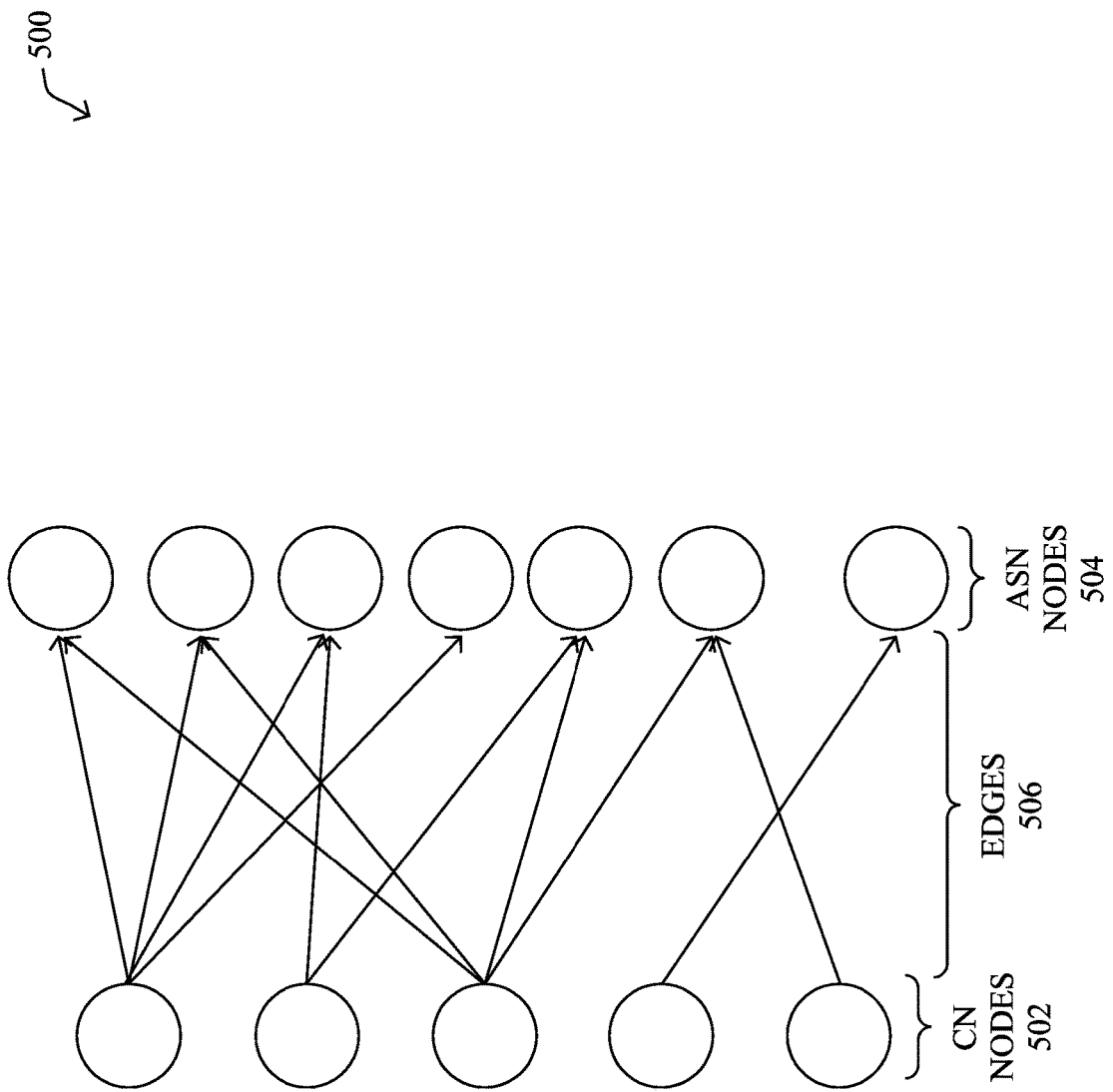

HISTOGRAM DATA 702: 1, 1, 1, 1, 2, 2, 2, 2, 3, 3, 3, 3, 4, 4, 4, 4, 5, 5, 6, 6, 7, 9, 10, 11, 12, 15, 17, 17, 23, 28, 32, 36, 38, 40, 46, 48, 70, 79, 88, 108, 339, 1848

VECTOR 704: 15, 5, 5, 8, 3, 2, 0, 1, 0

DETECTION OF BOTNET HOSTS USING GLOBAL ENCRYPTION DATA

RELATED APPLICATION

This application claims priority to U.S. Provisional Patent Appl. No. 62/711,125, filed on Jul. 27, 2018, entitled DETECTION OF BOTNET HOSTS USING GLOBAL ENCRYPTION DATA, by Mathew, et al., the contents of which are incorporated herein by reference.

TECHNICAL FIELD

The present disclosure relates generally to computer networks, and, more particularly, to the detection of botnet hosts using global encryption data.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic.

Beyond the various types of legitimate application traffic in a network, some network traffic may also be malicious. For example, some traffic may seek to exfiltrate sensitive information from a network, such as credit card numbers, trade secrets, and the like. Further types of malicious network traffic include network traffic that propagate the malware itself and network traffic that passes control commands to already infected devices, such as in the case of a distributed denial of service (DDoS) attack.

Inspection of network traffic is relatively straight-forward, when the network traffic is unencrypted. For example, techniques such as deep packet inspection (DPI), allows a networking device to inspect the payloads of packets and identify the contents of the packets. However, the use of traffic encryption is becoming increasingly ubiquitous Many instances of malware now use encryption, to conceal their network activity from detection. Beyond even the case of malware infection, the use of encrypted web traffic is becoming increasingly ubiquitous, making techniques such as DPI unable to identify threats and prevent sensitive data from being communicated elsewhere.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 5 illustrates an example bipartite graph mapping common names to autonomous system numbers;

DESCRIPTION OF EXAMPLE EMBODIMENTS

Overview

Figure 1A:
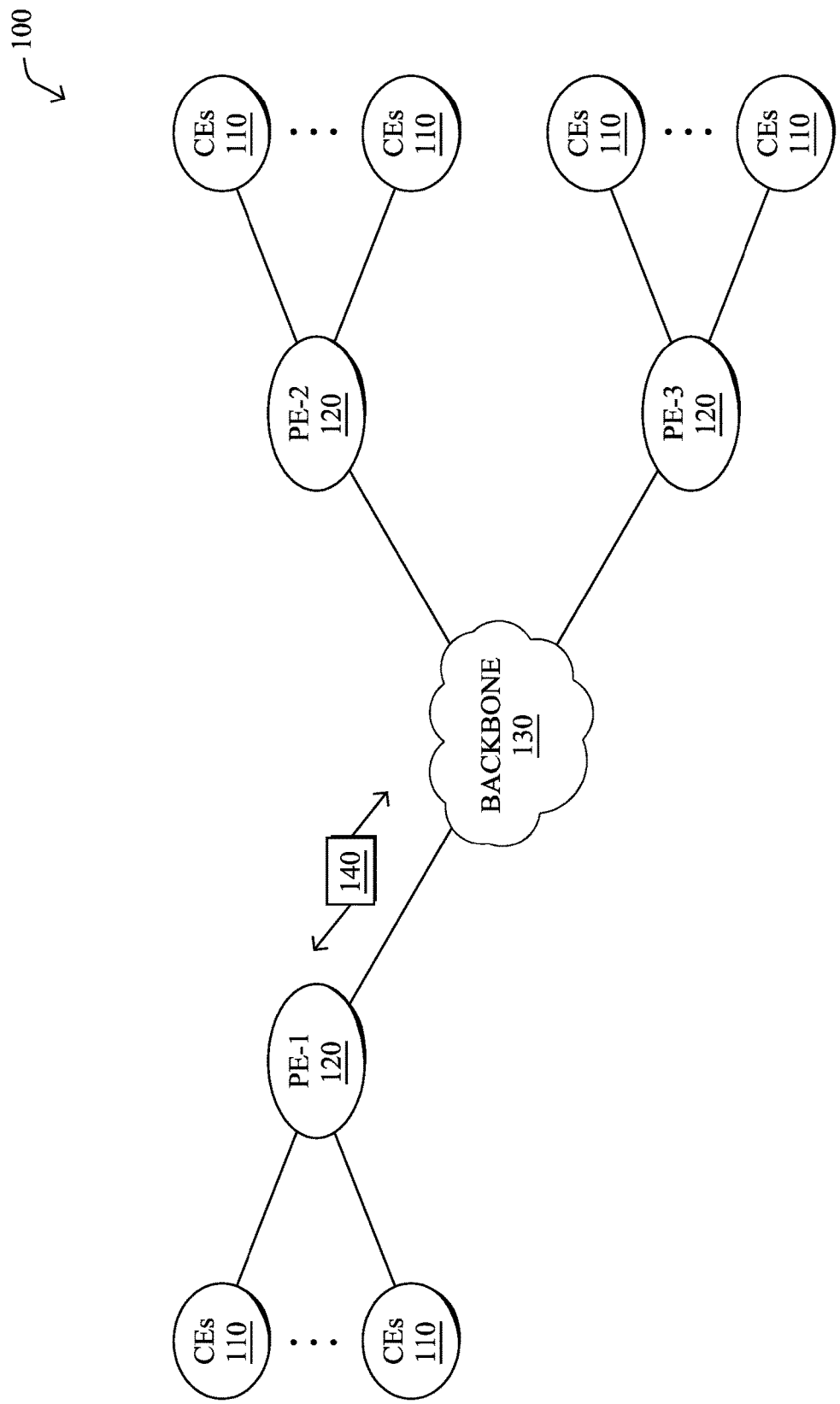
FIGS. 1A-1B illustrate an example communication network.

According to one or more embodiments of the disclosure, a device obtains certificate information for a plurality of network addresses. The device constructs, based on the certificate information, a bipartite graph that maps nodes representing common names from the certificate information to nodes representing autonomous systems. The device determines edge counts from the bipartite graph for the nodes representing the autonomous systems. The device identifies, based on the edge counts, a particular one of the common names as botnet-related by comparing edge counts for the autonomous systems associated with that particular common name to edge counts for the autonomous systems associated with one or more of the other common names.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
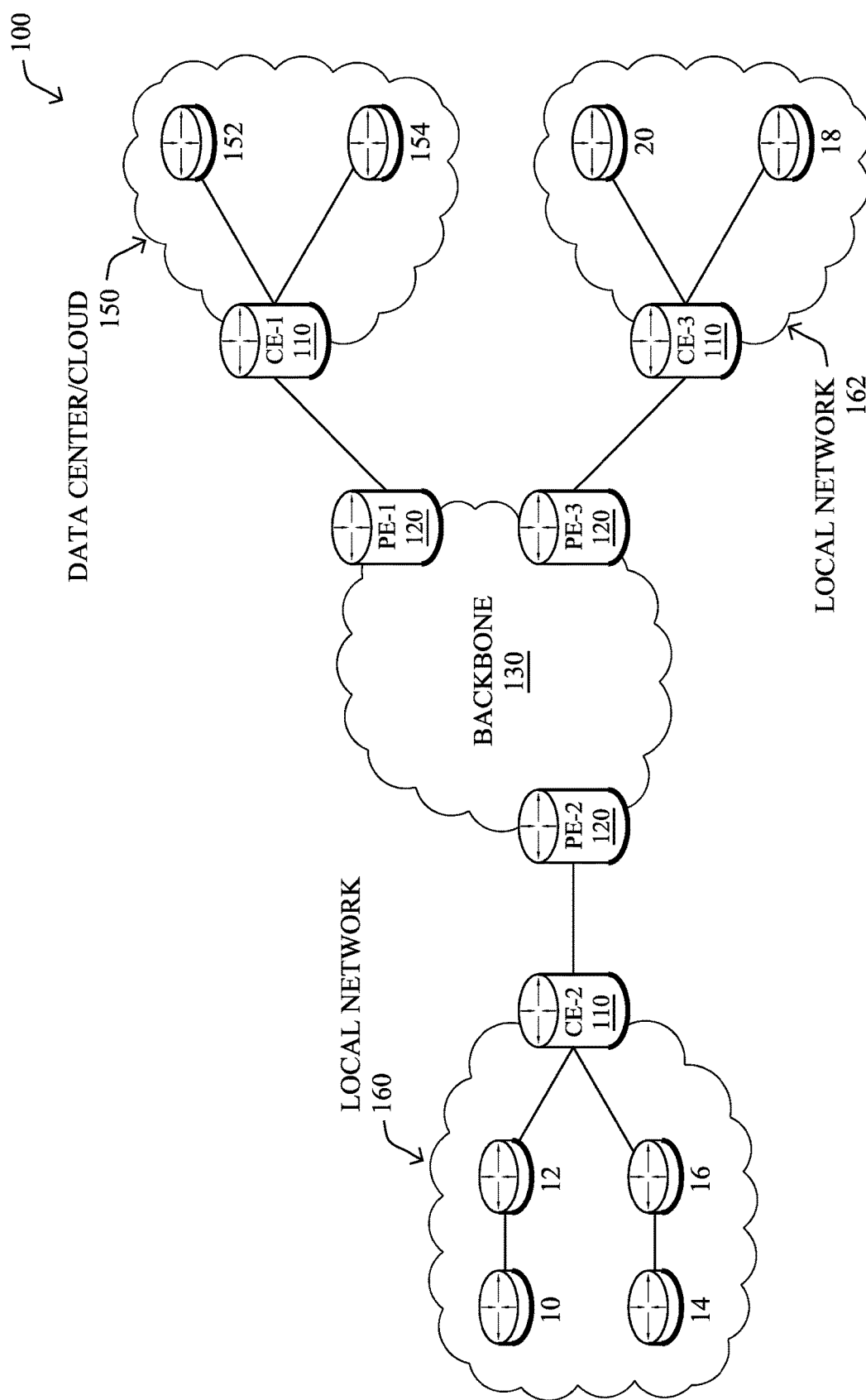

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
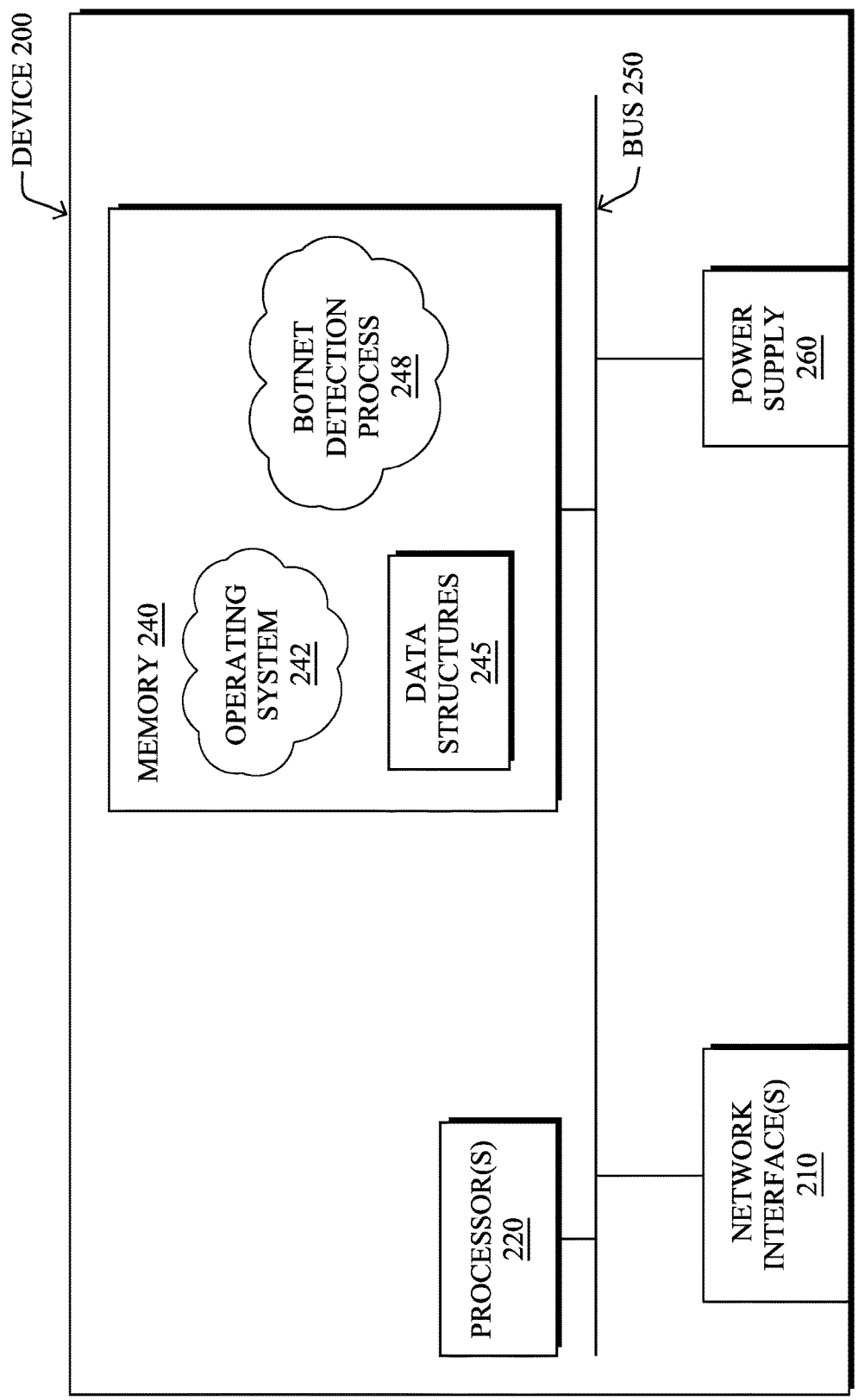
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154

(e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a botnet detection process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, botnet detection process 248 may execute one or more machine learning-based models to detect botnet activity in a network. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, botnet detection process 248 can use the model M to classify new data points, such as information regarding new domains in the network. Often, M is a statistical model, and the cost function is inversely proportional to the likelihood of M, given the input data.

In various embodiments, botnet detection process 248 may employ one or more supervised, unsupervised, or semi-supervised machine learning models. Generally, supervised learning entails the use of a training set of data, as noted above, that is used to train the model to apply labels to the input data. For example, the training data may include sample data that is "normal," or "botnet-related." On the other end of the spectrum are unsupervised techniques that do not require a training set of labels. Notably, while a supervised learning model may look for previously seen patterns that have been labeled as such, an unsupervised model does not require training data with labels, to perform the analysis. Semi-supervised learning models take a middle ground approach that uses a greatly reduced set of labeled training data.

Example machine learning techniques that botnet detection process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of domains that are incorrectly classified as botnet-related. Conversely, the false negatives of the model may refer to the number of domains that the model incorrectly classifies as normal, when actually botnet-related. True negatives and positives may refer to the number of domains that the model correctly classifies as normal or botnet-related, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, malware represent a serious threat to network devices, particularly malware that participate in a botnet. In some cases, traffic analysis (e.g., based on Netflow, IPFIX, DNS, etc. data) and binary analysis can be used to identify botnet C2 servers, allowing for the detection of infected devices. However, not all C2 servers are immediately detectable using this approach. Notably, some botnet domains may still be able to avoid detection from traffic analysis alone.

A key insight is that many botnets, such as Zbot fast flux proxy networks, effectively operate as content delivery networks (CDNs). In general, CDNs are global networks that aid large corporations and other entities to serve media content to their global audience. For example, a highly distributed CDN can aid in the resiliency of a website by offering multiple caches of the website across the globe.

Figure 3:
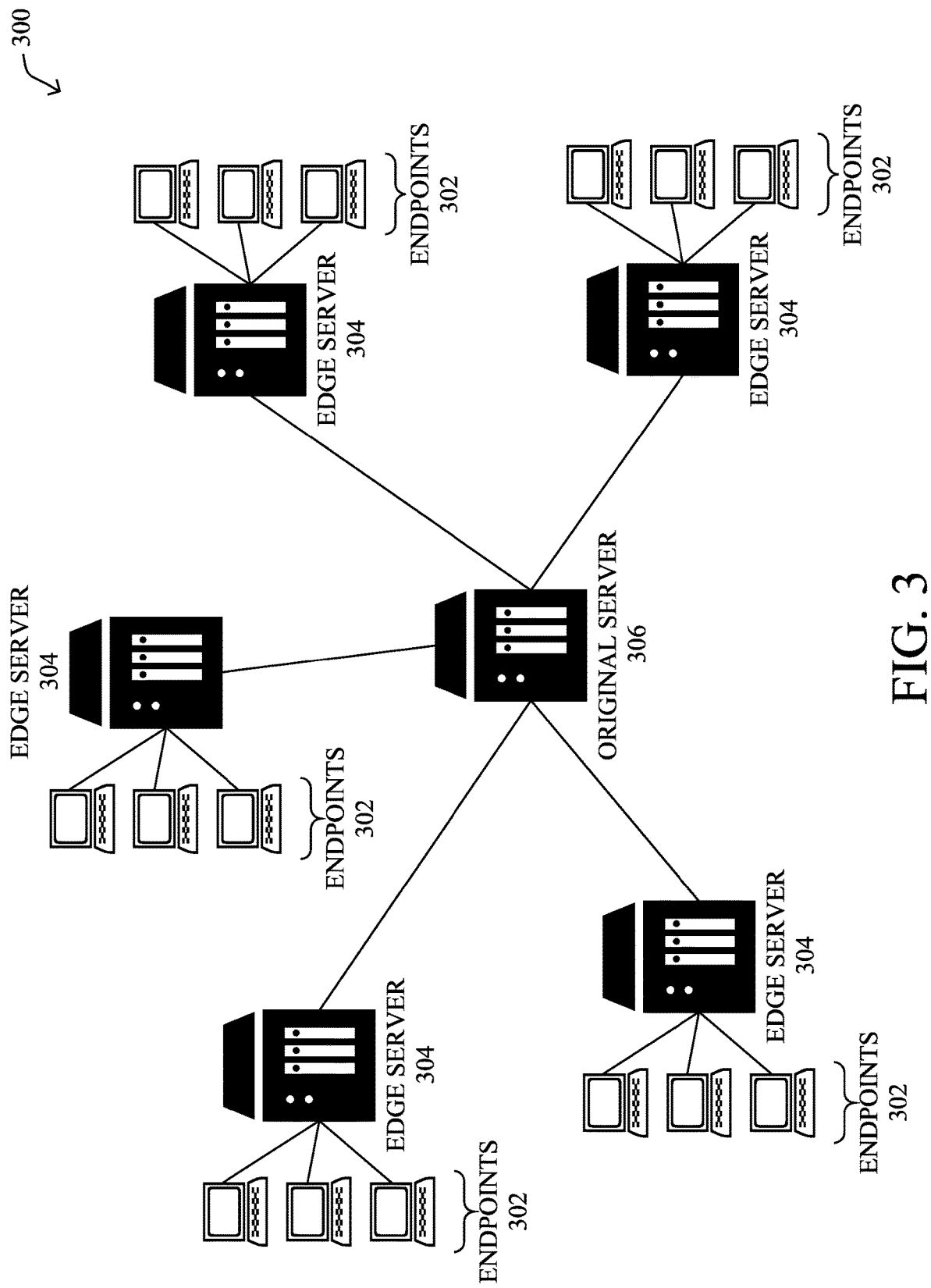
FIG. 3 illustrates an example content delivery network (CDN)

FIG. 3 illustrates an example CDN 300. As shown, CDN 300 may include an original server 306 that serves as the original source of content for consumption by endpoints 302, which may be highly distributed, from a geographic standpoint. For example, original server 306 may serve a webpage, streaming media, or the like, to endpoints 302.

While endpoints 302 could obtain the content directly from original server 306, the geographic distances between them and server 306 could lead to relatively large latencies in delivering the content, depending on where a given endpoint 302 is located in relation to server 306. Accordingly, original server 306 may replicate the content to any number of edge servers 304. Thus, when a given endpoint 302 requests the content from original server 306, one of edge servers 304 located closer to that endpoint may instead deliver the content to the endpoint.

Likewise, the use of edge servers 304 in CDN 300 also aids in the resiliency of the content, as duplicates of the content are available across the various edge servers 304. For example, if one of servers 304 goes down, CDN 300 can adapt by directing the content requests to one of the other edge servers 304, thereby allowing the requesting endpoint 302 to still receive the content.

Directing a content request from an endpoint 302 to a particular server 304 in CDN 300 may be achieved during the domain name system (DNS) lookup phase of the content request. Notably, when the endpoint 302 issues a DNS query for the domain name of original server 306, the DNS lookup may resolve to an Internet Protocol (IP) address of one of edge servers 304. Such a lookup may take into account the geographic location of the IP address of the endpoint 302 that issued the request, allowing the endpoint 302 to be directed towards the closest edge server 304 of CDN 300.

To ensure a secure connection to a domain, CDN 300 may use public key certificates, such as X.509 certificates. As would be appreciated, such certificates can be used with Secure Socket Layer (SSL) or Transport Layer Security (TLS), to implement HTTPS connections. Such certificate information typically includes, among other data, a common name field that matches the domain being queried. Certificates also typically use secure hash algorithms (SHAs), which are cryptographic hash functions, to protect against alteration of the data by 'signing' the certificate. Note that a common name can map to different SHA values.

Botnets, such as Zbot (also known as Zeus or ZeuS), operate in a manner similar to that of legitimate CDNs, to deliver malicious content to endpoints. Such content could, for example, include malware, ransomware, phishing content, and the like. In particular, these types of botnets use what is known as a fast flux network whereby infected hosts register and de-register their IP addresses with a given domain name via DNS. As in the case of traditional CDNs, this helps to protect the original source of the content behind a set of infected bots that act as proxies for the content. Similarly, this also makes it extremely difficult to take down the botnet, as the set of registered addresses continually changes. Identification of such a botnet, as well as the domain(s) used by the botnet, remains particularly challenging.

Detection of Botnet Hosts Using Global Encryption Data

The techniques herein allow for global encryption data, such as secure socket layer (SSL) scan data, to be used to identify domains that belong to worldwide botnet campaigns. In some embodiments, this can be accomplished using a combination of graph and distance based techniques.

Illustratively, the techniques described herein may be performed by hardware, software, and/or firmware, such as in accordance with the botnet detection process 248, which may include computer executable instructions executed by the processor 220 (or independent processor of interfaces 210) to perform functions relating to the techniques described herein.

Specifically, according to various embodiments, a device obtains certificate information for a plurality of network addresses. The device constructs, based on the certificate information, a bipartite graph that maps nodes representing common names from the certificate information to nodes representing autonomous systems. The device determines edge counts from the bipartite graph for the nodes representing the autonomous systems. The device identifies, based on the edge counts, a particular one of the common names as botnet-related by comparing edge counts for the autonomous systems associated with that particular common name to edge counts for the autonomous systems associated with one or more of the other common names.

Operationally, certain botnets, such as ZBot, use infected home routers as hosting machines for the botnet. They can store either sensitive material or host bulletproof hosting domains. Identifying these domains from DNS signal data is a challenge because there are no discernible client query patterns. However, to ensure security of the domains hosted on these routers, ZBot operators place SSL certificates on each domain. According to various embodiments, the techniques herein propose taking globally scanned encryption (SSL) data and identifying SSL hosting patterns that can reveal a ZBot domain.

Figure 4:
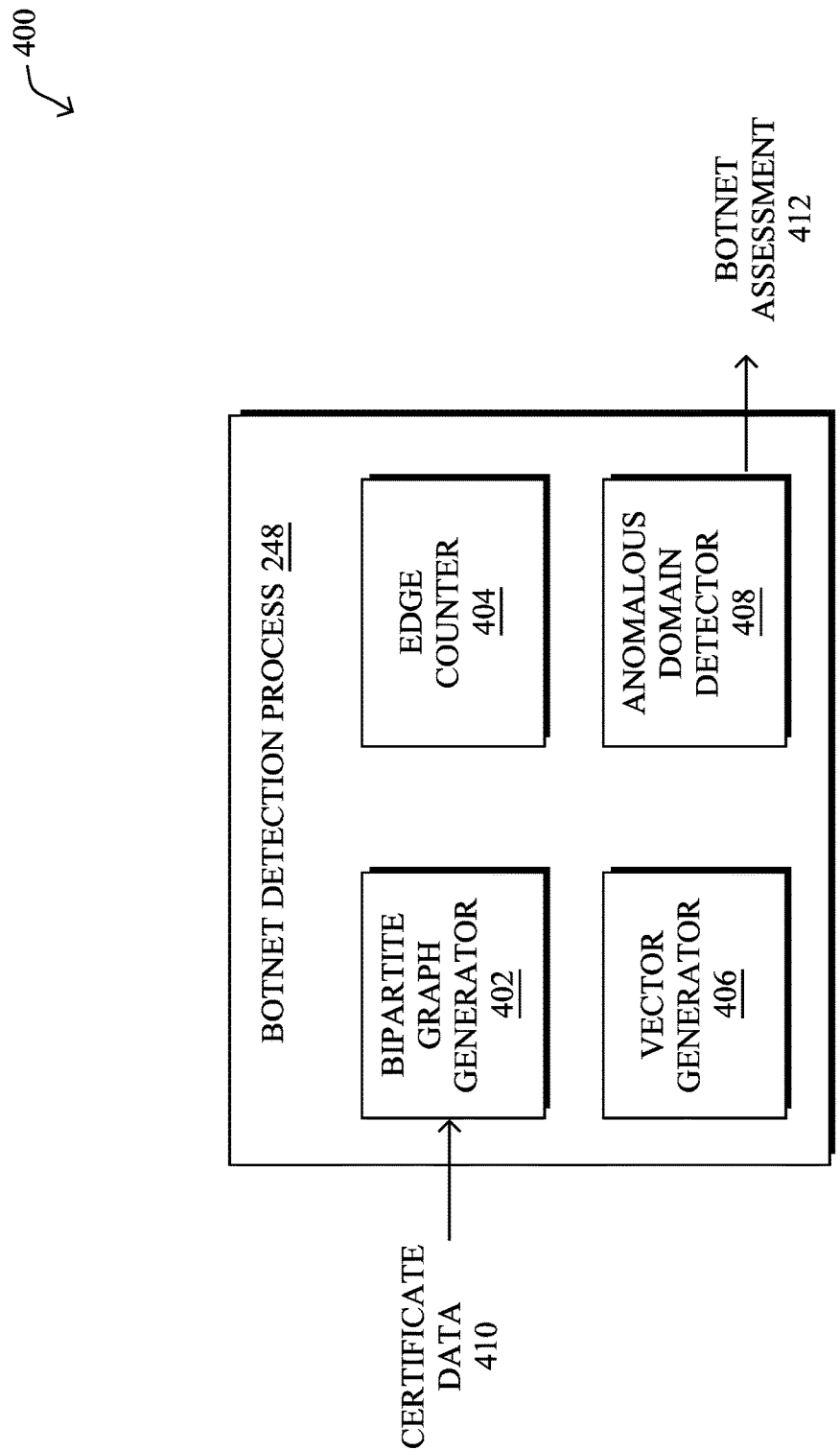
FIG. 4 illustrates an example architecture for identifying a botnet.

FIG. 4 illustrates an example architecture 400 for identifying a botnet, according to various embodiments. As shown, botnet detection process 248 may include any or all of the following components: a bipartite graph generator 402, an edge counter 404, a vector generator 406, and an anomalous domain detector 408. In some implementations, components 402-408 may be implemented in a distributed manner or, alternatively, as their own stand-alone services. In addition, the functionalities of components 402-408 of architecture 400 may be combined, omitted, or implemented as part of other processes, as desired.

In some embodiments, the first step of the detection process involves bipartite graph generator 402 obtaining certificate data 410 and generating a bipartite graph from data 410. In general, a bipartite graph comprises two disjoint and independent sets of nodes/vertices, with edges of the graph connecting exactly one node in the first set to exactly one node in the second set. For example, bipartite graph generator 402 may do so by creating a mapping from the SSL Hash→IP and/or SSL CommonName (CN)→IP→Autonomous System Number (ASN). This new mapping schema forms the basis of a bipartite graph between SSL Hash or CN→ASN.

As would be appreciated, certificates, such as X.509 certificates typically include certificate data 410 such as the issuer, subject, creation date, and associated IP address(es). In addition, X.509 certificates also include a 'CommonName' field that is either blank or includes an alphanumeric string that corresponds to a domain name. Such information is valuable in that it can reveal the ownership of a particular IP address as well as to map the relationships between residential and commercial IP spaces.

To generate certificate data 410, any number of scans can be performed across any number of IP addresses, either by botnet detection process 248 or by another service. For example, bi-weekly or weekly scans of IPv4 addresses on port 443 can be performed, to associate an IP address with a certificate hosted at that address. In turn, bipartite graph generator 402 can extract out the common name information from certificate data 410 and associate the common names from the certificates to ASNs.

FIG. 5 illustrates an example bipartite graph 500 mapping common names (CNs) to autonomous system numbers (ASNs), according to various embodiments. As shown, each common name extracted from the certificate data can be represented as its own CN node 502 in graph 500. Likewise, each ASN can be represented as its own ASN node 504 in graph 500. Edges 506 between CN nodes 502 and ASN nodes 504 represent the mapping of a particular CN to a particular ASN, as indicated by the captured certificate data. In another embodiment, CNs can be mapped to IP address ranges, instead of ASNs. However, mapping to ASNs has been found to give the best resolution for purposes of analyzing the captured data.

Referring again to FIG. 4, once bipartite graph generator 402 has constructed a bipartite graph from certificate data 410, edge counter 404 may calculate an edge count for each node in the graph. In particular, experimentation has shown that the types of ASNs that host a common name tend to be anomalous for botnets. More specifically, the popularity of an ASN refers to the number of common names hosted on the ASN and can be determined by the edge count of the node representing the ASN in the bipartite graph. Similarly, the edge counts for the common name nodes in the bipartite graph can also yield valuable insight into botnet behaviors.

Figure 6A:
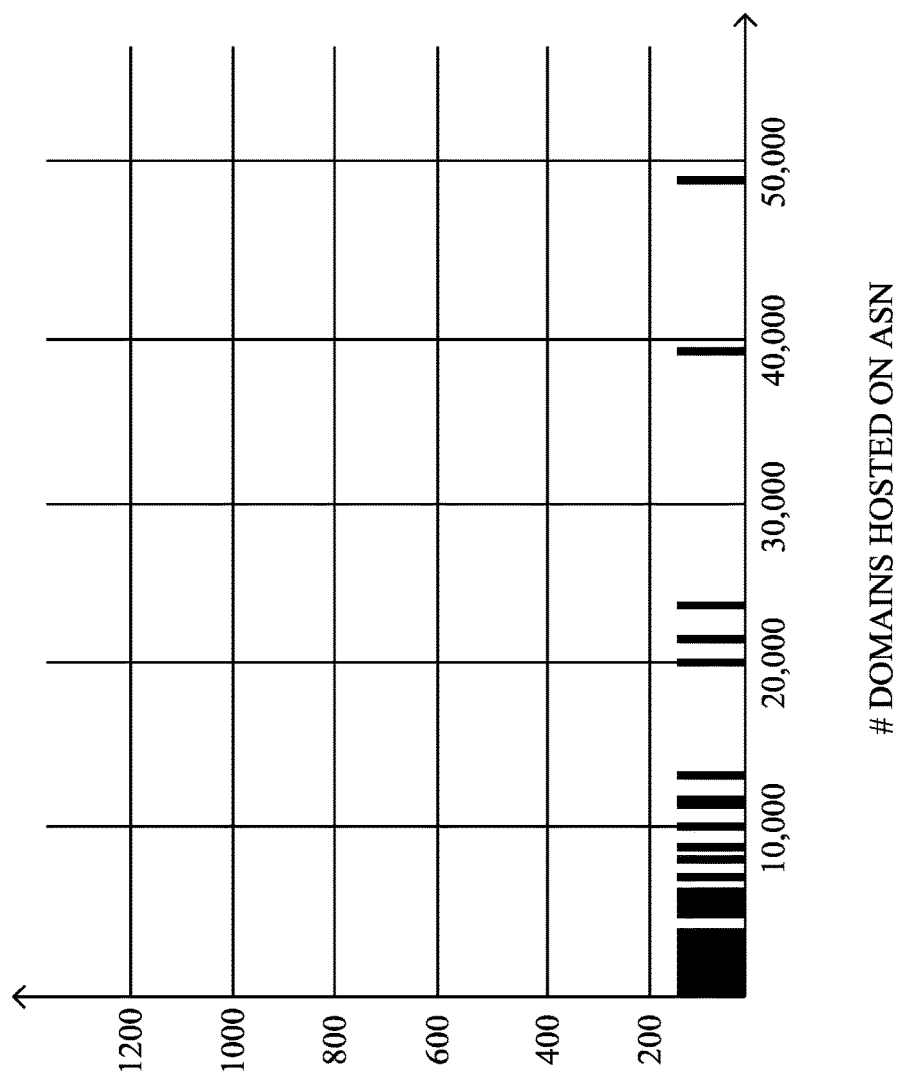
FIGS. 6A-6D illustrate example histograms based on a bipartite graph.

FIGS. 6A-6D illustrate example histograms based on a bipartite graph constructed using the techniques herein. To illustrate the teachings herein, certificate scan data was captured over the span of a month, revealing the use of 22,682 individual ASNs. FIG. 6A illustrates a histogram plot 600 of the number of domains/common names hosted per ASN from this scan. As noted above, such counts can be calculated by counting the edges of the bipartite graph nodes representing each of the ASNs. From histogram plot 600, it can be seen that at least one ASN hosts more than 50,000 unique common names, while the vast majority of ASNs host between 1-100 common names/domains.

Figure 6B:
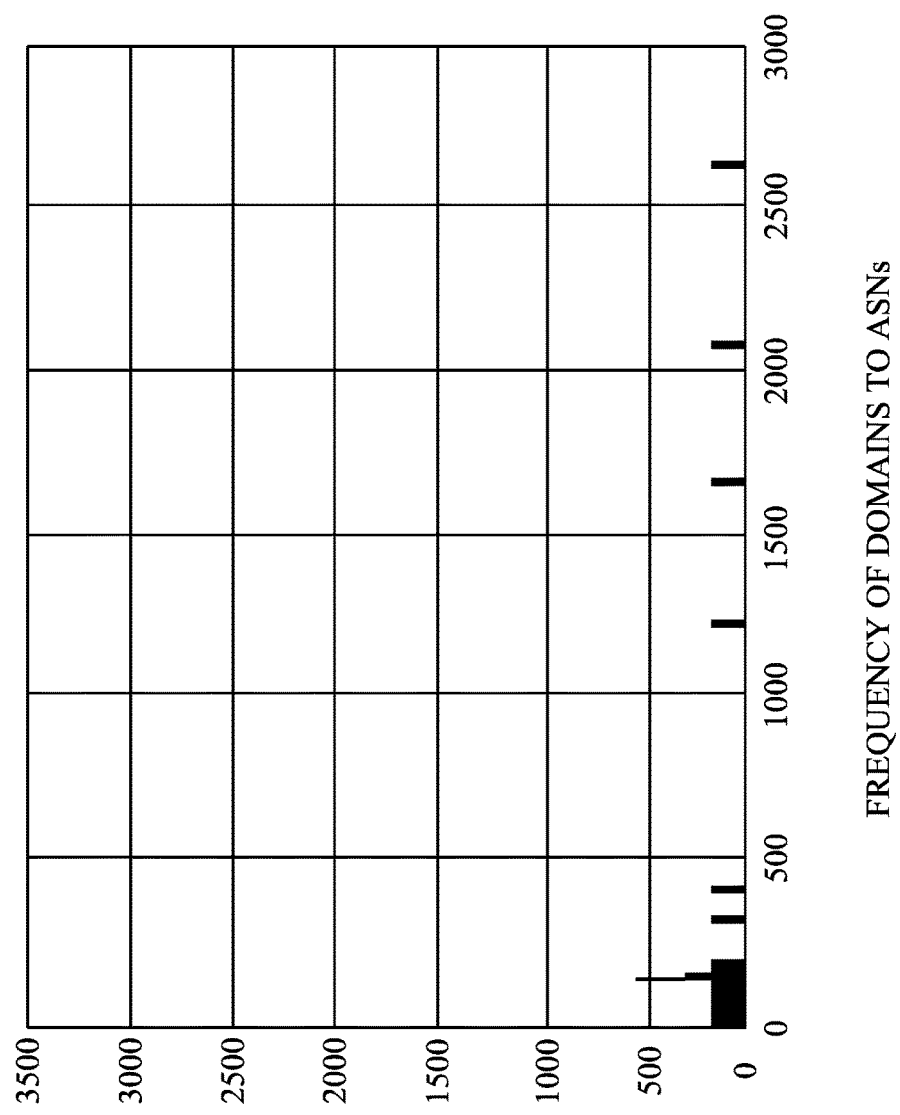

FIG. 6B illustrates another histogram plot 610 showing the frequency of domains/common names to ASNs from the scan information mentioned above. More specifically, histogram plot 610 was constructed based on the bipartite graph edge counts for the set of 850,236 domains/CNs observed from the scan. As shown, the vast majority of domains are hosted by 1-200 ASNs, with several outliers exceeding over 1,000.

Figure 6C:
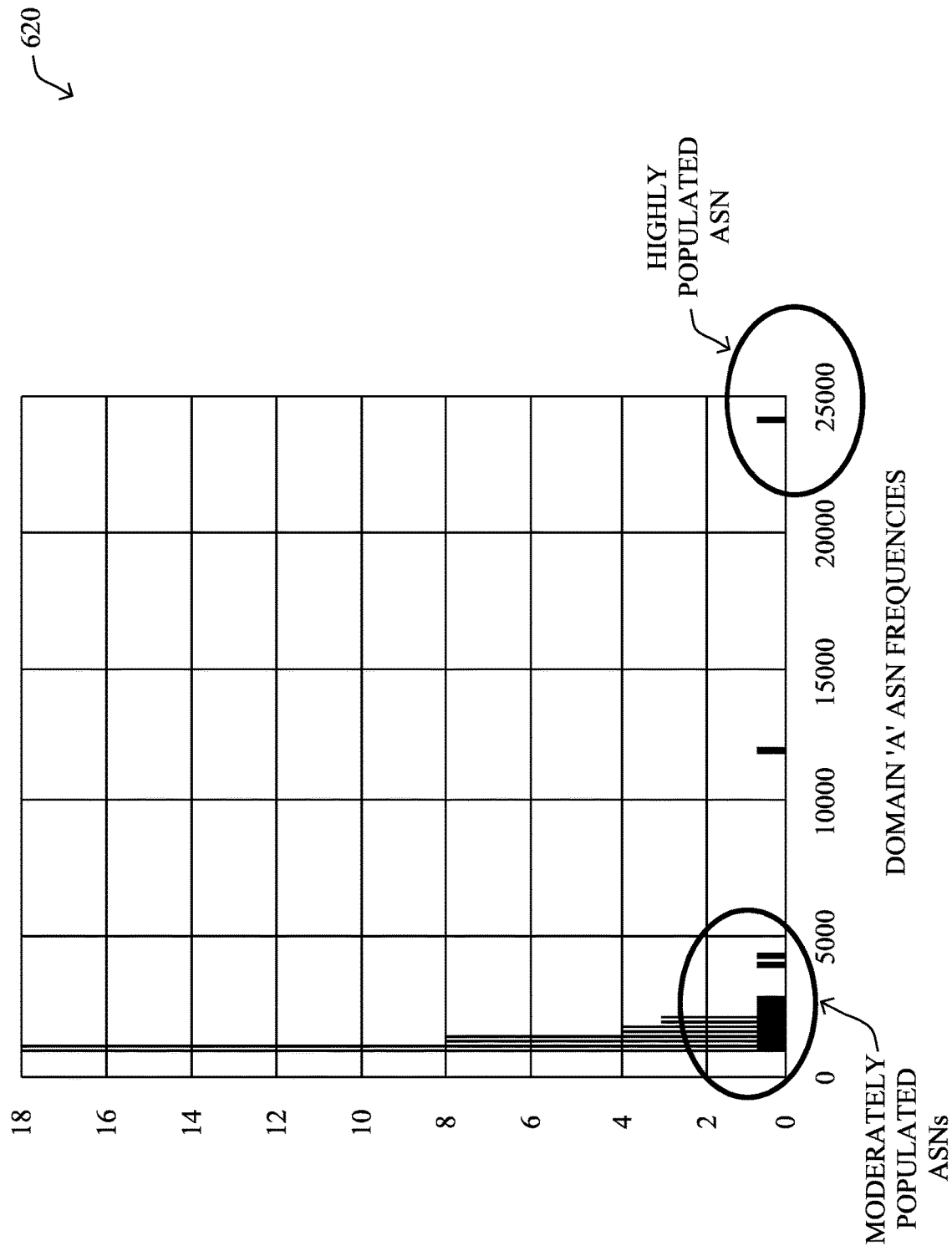
Figure 6D:
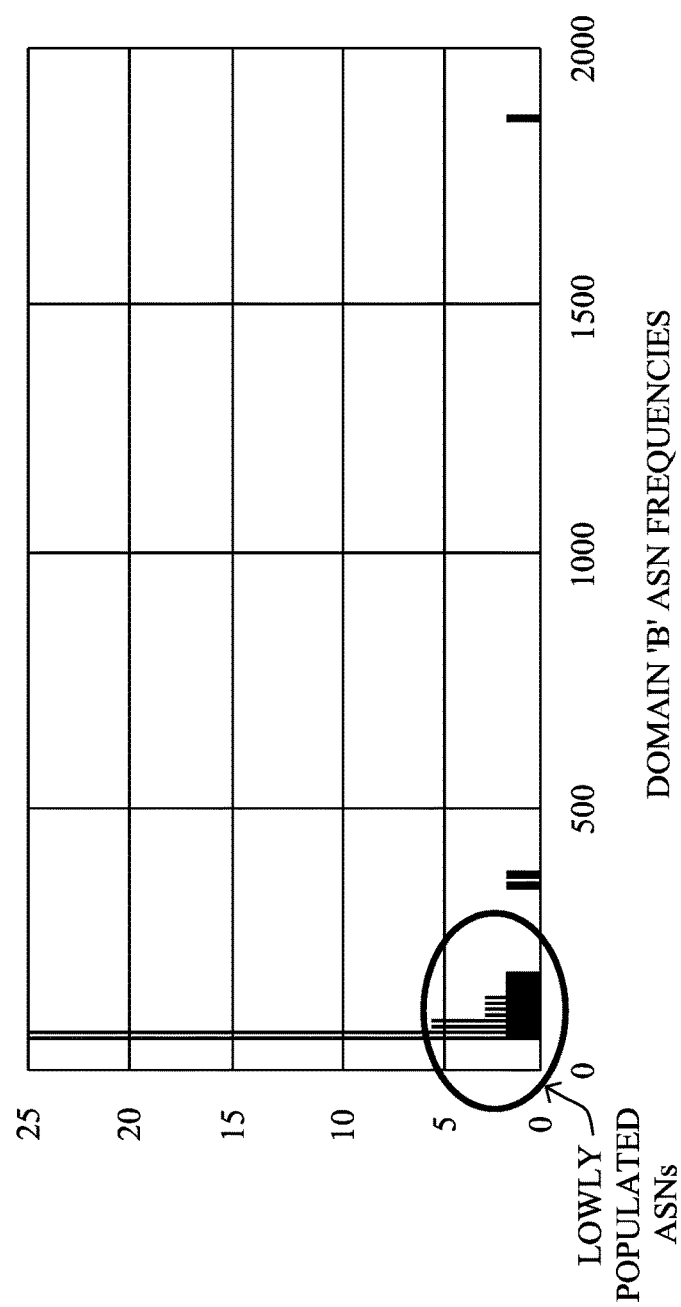

FIGS. 6C-6D illustrate histogram plots 620, 630 showing the frequency of domains to ASNs for a particular domain/ CN 'A' and domain/CN 'B,' respectively. In particular, the x-axis of histogram plots 620, 630 denotes the type/popularity of ASN and the y-axis denotes the frequency of that type of ASN hosting a certificate for the domain. From plot 620, it becomes clear that there are two different types of ASNs that host certificates for domain 'A': moderately populated ASNs and highly populated ASNs, with one ASN hosting approximately 25,000 domains. In contrast, as shown in plot 630 in FIG. 6D, the most popular ASN hosting a certificate for domain 'B' hosts approximately 1,800 domains, with the vast majority that host certificates for that domain hosting less than 108 unique domains/CNs.

Referring again to FIG. 4, botnet detection process 248 may leverage histograms of the edge counts from edge counter 404, to detect domains associated with a botnet. From FIGS. 6C-6D, it can be seen that the two domains exhibit very different behaviors, in terms of the types of ASNs that host certificates for them. However, the histograms cannot be compared directly and need to be compared on the same scale. Accordingly, botnet detection process 248 may also include a vector generator 406 and an anomalous domain detector 408, which is configured to make a botnet assessment 412 for an individual domain (e.g., whether the domain is linked to a botnet or not).

To determine whether a given domain is anomalous and, thus, indicative of a botnet, vector generator 406 may assess edge count histograms constructed by edge counter 404 and form feature vectors from the histograms. In various embodiments, vector generator 406 may do so by first filtering out common names/domains that map to fewer than a threshold number of ASNs. For example, vector generator 406 may filter out common names that map to ten or fewer ASNs. The reasoning for this is that the amount of information contained locally by edge data decreases, as the amount of ASNs to which a common name maps also decreases. Similarly, on the opposite end of the spectrum, vector generator 506 may also filter out common names that belong to large, established companies, such as Akami and Google.

In various embodiments, vector generator 506 may generate a feature vector representation of each common name/ domain under scrutiny by bucketing the edge counts of its different types of hosting ASNs into entries in the feature vector. In other words, the resulting vector may quantify the different types of ASNs that host certificates for the common name/domain, based on their popularities/edge counts. For example, vector generator 506 may bucket the ASN frequencies into nine or ten 'buckets,' as would be appreciated by one skilled in the art.

Figure 7:
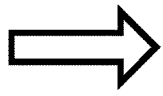
FIG. 7 illustrates an example of mapping a common name/domain to a vector.

To illustrate the functioning of vector generator 506, FIG. 7 illustrates an example 700 of mapping a common name/ domain to a vector. As shown, assume that histogram data 702 includes the edge counts/measures of popularity of the ASNs that host certificates for the domain. To form feature vector 704, each bucket/entry in feature vector 704 may count the number of ASNs from histogram data 702 having a defined range of popularity. For example, assume that the first 'bucket' is defined as the count of ASNs hosting between 1-5 common names/domains, that the second bucket is defined as the count of ASNs hosting between 6-10 common names/domains, etc.

In some embodiments, uneven ranges for the bucketing can be used, so as to give higher weights to common names that are hosted on less popular ASNs. Notably, tighter ranges for less popular ASNs can be used, while larger ranges used for more popular ASNs. For example, while the first two buckets may be based on edge count ranges in increments of five (e.g., 1-5, 5-10), the additional buckets may use longer ranges of edge counts (e.g., 10-20 for the third bucket, 20-50 for the fourth bucket, etc.).

For a given common name, the process may then iterate over the ASNs hosting certificates for that name and, depending on the edge count for a given ASN, increment the count at that particular position in vector 704. This step transforms each common name/domain into an n-dimensional vector (e.g., a 9-D or 10-D vector) that documents the type of ASNs on which the common name is hosted.

Referring again to FIG. 4, in various embodiments, anomalous domain detector 408 may identify a common name/domain as being anomalous by comparing the pairwise Euclidean distances between the vectors from vector generator 406 of common names that are hosted on a similar number of ASNs. For example, anomalous domain detector 408 may calculate the distance between the pairwise distance d between two vectors, p and q, based on their constituent entries $q_i$ and $p_i$ as follows:

$$d(p, q) = \quad \text{Equation 1}$$
$$d(q, p) = \sqrt{(q_1 - p_1)^2 + (q_2 - p_2)^2 + \ldots + (q_n - p_n)^2} = \sqrt{\sum_{i=1}^{n} (q_i - p_i)^2}.$$

Once anomalous domain detector 408 has calculated the pairwise distances between the common name vectors, detector 408 may sort the output and flag those common names that differ from their neighbors by a threshold amount as being potentially botnet-related. In turn, anomalous domain detector 408 may output these domain(s)/common name(s) as part of botnet assessment 412, to initiate one or more mitigation actions in the network. For example, such mitigation actions may entail blocking traffic associated with a suspicious domain, sending a notification to a network administrator or user, or the like.

Figure 8:
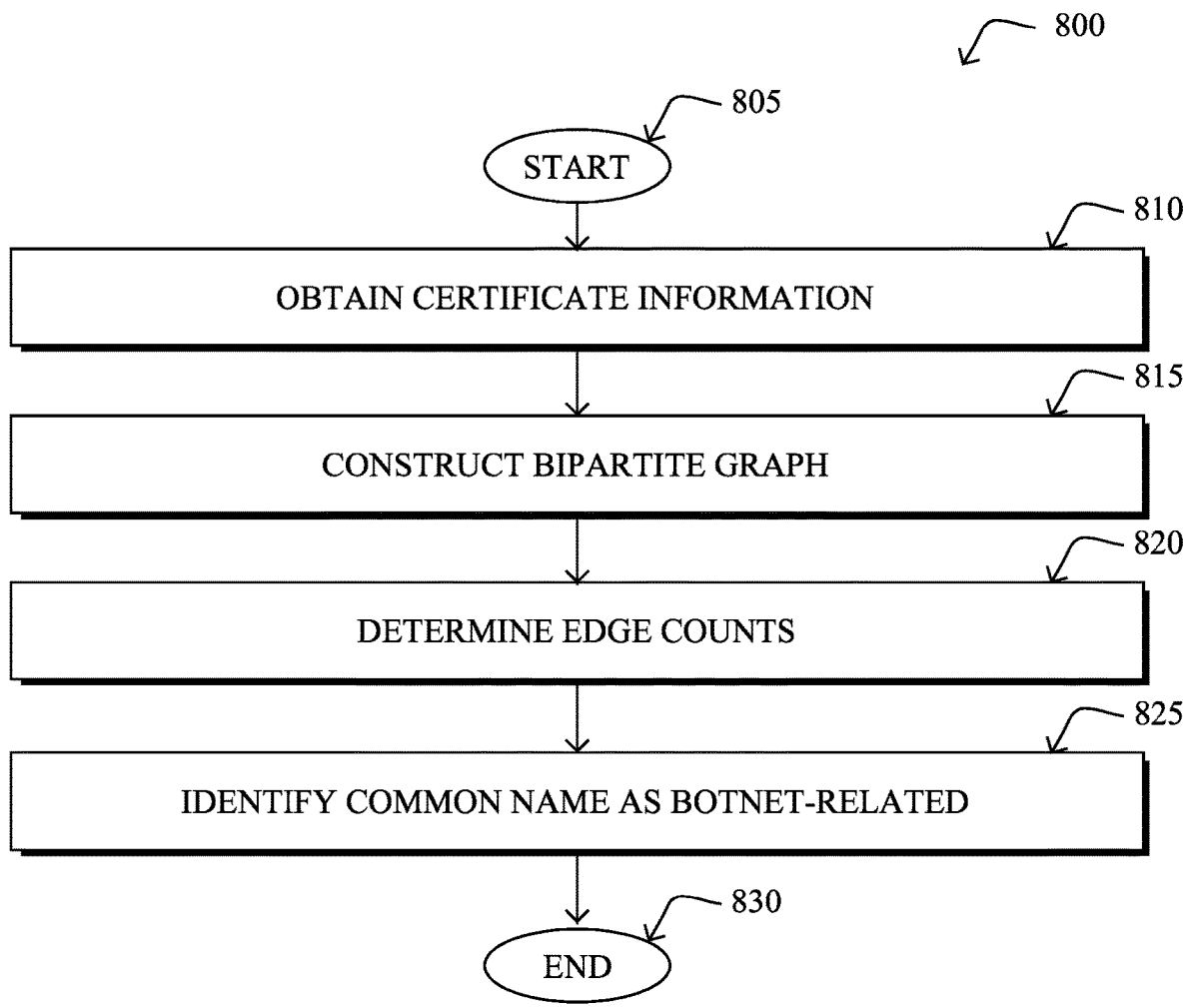
FIG. 8 illustrates an example simplified procedure for detecting botnet activity.

FIG. 8 illustrates an example simplified procedure 800 for detecting botnet activity, in accordance with one or more embodiments described herein. For example, a non-generic, specifically configured device (e.g., device 200) may perform procedure 800 by executing stored instructions (e.g., process 248) to provide a botnet detection service to a network. The procedure 800 may start at step 805, and continues to step 810, where, as described in greater detail above, the device may obtain certificate information for a plurality of network addresses. For example, the certificate information may comprise X.509 certificate information, such as the common names/domains of the certificates, the associated IP address(es), autonomous system numbers (ASNs), and the like. Such certificate information can, for example, be captured by scanning the ports (e.g., port 443) of a set of IP addresses.

At step 815, as detailed above, the device may construct, based on the certificate information, a bipartite graph that maps nodes representing common names from the certificate information to nodes representing autonomous systems. Notably, each node in the bipartite graph may represent either a specific common name/domain or an autonomous system (e.g., ASN). Edges between the nodes then represent the relationships between the common names and autonomous systems. For example, an edge between one common name node and an autonomous system node in the bipartite graph may signify that the autonomous system hosts a certificate for the common name.

At step 820, the device may determine edge counts from the bipartite graph for the nodes representing the autonomous systems, as described in greater detail above. For example, for a given common name node, the device may count the number of autonomous system nodes to which it is connected. Similarly, for each of those autonomous system nodes, the device may count the number of common names hosted by that autonomous system.

At step 825, as detailed above, the device may identify a particular one of the common names as botnet-related. For example, the device may compare edge counts for the autonomous systems associated with that particular common name to edge counts for the autonomous systems associated with one or more of the other common names. In some embodiments, the device may do so by first forming histograms from the edge counts from step 820 and bucketing the histogram information, to form vectors for the common names. In turn, the device may compare the Euclidean pairwise distances between the constructed vectors, to identify common names that use different types of ASNs than its peers. In some embodiments, the ranges of edge counts used by the device to form the vectors may be unequal, so as to give greater weighting to common names that are hosted on less popular autonomous systems, which are typically more interesting from the standpoint of identifying botnet activity. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for the detection of botnet hosts, it is to be understood that various other adaptations and modifications may be made within the spirit and scope of the embodiments herein. For example, while certain embodiments are described herein with respect to detecting Zbot related botnets, the techniques herein are not limited as such and may be used to detect any number of other forms of botnets, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
obtaining, by a device, certificate information for a plurality of network addresses;
constructing, by the device and based on the certificate information, a bipartite graph that maps nodes representing common names from the certificate information to nodes representing autonomous systems;
determining, by the device, edge counts from the bipartite graph for the nodes representing the autonomous systems; and
identifying, by the device and based on the edge counts, a particular one of the common names as botnet-related by comparing edge counts for the autonomous systems associated with that particular common name to edge counts for the autonomous systems associated with one or more of the other common names.

2. The method as in claim 1, wherein the certificate information comprises X.509 certificate information.

3. The method as in claim 1, wherein the botnet is a Zbot botnet.

4. The method as in claim 1, wherein identifying the particular common name as botnet-related comprises:
forming, for the particular common name and the one or more other common names, vectors based on the edge counts for the nodes in the bipartite graph representing the autonomous systems associated with those common names; and comparing distances between the vectors, to identify the particular common name as anomalous.

5. The method as in claim 4, wherein forming the vectors based on the edge counts comprises:

bucketing the edge counts into ranges of edge counts.

6. The method as in claim 5, wherein the ranges of edge counts are unequal and give greater weighting to common names that are hosted on less popular autonomous systems.

7. The method as in claim 4, wherein comparing the distances between the vectors comprises:

computing pairwise Euclidean distances between the vectors.

8. The method as in claim 1, wherein the certificate information for a plurality of network addresses is captured via scanning of the network addresses.

9. An apparatus, comprising:

one or more network interfaces;

a processor coupled to the network interfaces and configured to execute one or more processes; and a memory configured to store a process executable by the processor, the process when executed configured to:

obtain certificate information for a plurality of network addresses;

construct, and based on the certificate information, a bipartite graph that maps nodes representing common names from the certificate information to nodes representing autonomous systems;

determine edge counts from the bipartite graph for the nodes representing the autonomous systems; and identify, based on the edge counts, a particular one of the common names as botnet-related by comparing edge counts for the autonomous systems associated with that particular common name to edge counts for the autonomous systems associated with one or more of the other common names.

10. The apparatus as in claim 9, wherein the certificate information comprises X.509 certificate information.

11. The apparatus as in claim 9, wherein the botnet is a Zbot botnet.

12. The method as in claim 1, wherein identifying the particular common name as botnet-related comprises:

forming, for the particular common name and the one or more other common names, vectors based on the edge counts for the nodes in the bipartite graph representing the autonomous systems associated with those common names; and comparing distances between the vectors, to identify the particular common name as anomalous.

13. The apparatus as in claim 12, wherein the apparatus forms the vectors based on the edge counts by:

bucketing the edge counts into ranges of edge counts.

14. The apparatus as in claim 13, wherein the ranges of edge counts are unequal and give greater weighting to common names that are hosted on less popular autonomous systems.

15. The apparatus as in claim 12, wherein the apparatus compares the distances between the vectors by:

computing pairwise Euclidean distances between the vectors.

16. The apparatus as in claim 9, wherein the certificate information for a plurality of network addresses is captured via scanning of the network addresses.

17. A tangible, non-transitory, computer-readable medium storing program instructions that cause a device to execute a process comprising:

obtaining, by the device, certificate information for a plurality of network addresses;

constructing, by the device and based on the certificate information, a bipartite graph that maps nodes representing common names from the certificate information to nodes representing autonomous systems;

determining, by the device, edge counts from the bipartite graph for the nodes representing the autonomous systems; and identifying, by the device and based on the edge counts, a particular one of the common names as botnet-related by comparing edge counts for the autonomous systems associated with that particular common name to edge counts for the autonomous systems associated with one or more of the other common names.

18. The computer-readable medium as in claim 17, wherein identifying the particular common name as botnet-related comprises:

forming, for the particular common name and the one or more other common names, vectors based on the edge counts for the nodes in the bipartite graph representing the autonomous systems associated with those common names; and comparing distances between the vectors, to identify the particular common name as anomalous.

19. The computer-readable medium as in claim 18, wherein forming the vectors based on the edge counts comprises:

bucketing the edge counts into ranges of edge counts.

20. Computer-readable medium as in claim 19, wherein the ranges of edge counts are unequal and give greater weighting to common names that are hosted on less popular autonomous systems.

* * * * *

UNITED STATES PATENT AND TRADEMARK OFFICE
CERTIFICATE OF CORRECTION

PATENT NO. : 11,134,073 B2
APPLICATION NO. : 16/251220
DATED : September 28, 2021
INVENTOR(S) : Thomas Manianghat Mathew et al.

Page 1 of 1

It is certified that error appears in the above-identified patent and that said Letters Patent is hereby corrected as shown below:

In the Specification

Column 12, Line 37, please amend as shown:
thereof. Accordingly, this description is to be taken only by Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*